United States Patent
Nair et al.

(10) Patent No.: US 10,924,396 B2
(45) Date of Patent: Feb. 16, 2021

(54) ACHIEVING L2 TUNNEL REDUNCANCY AND L3 LOAD BALANCING

(71) Applicant: HEWLETT PACKARD ENTERPRISE DEVELOPMENT LP, Houston, TX (US)

(72) Inventors: Anoop Govindan Nair, Karnataka (IN); Anil Raj, Karnataka (IN); Venkatavaradhan Devarajan, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 16 days.

(21) Appl. No.: 16/276,853

(22) Filed: Feb. 15, 2019

(65) Prior Publication Data
US 2020/0084144 A1 Mar. 12, 2020

(30) Foreign Application Priority Data

Sep. 10, 2018 (IN) .............................. 201841034039

(51) Int. Cl.
| | |
|---|---|
| *H04L 12/713* | (2013.01) |
| *H04L 12/46* | (2006.01) |
| *H04L 12/66* | (2006.01) |
| *H04L 1/22* | (2006.01) |
| *H04L 29/14* | (2006.01) |

(52) U.S. Cl.
CPC .............. *H04L 45/586* (2013.01); *H04L 1/22* (2013.01); *H04L 12/4633* (2013.01); *H04L 12/66* (2013.01); *H04L 69/40* (2013.01)

(58) Field of Classification Search
CPC ....... H04L 12/4633; H04L 12/66; H04L 1/22; H04L 45/586; H04L 69/40
See application file for complete search history.

(56) References Cited

U.S. PATENT DOCUMENTS

| | | |
|---|---|---|
| 8,467,399 B2 | 6/2013 | Tadimeti et al. |
| 8,532,116 B2 | 9/2013 | Portolani et al. |
| (Continued) | | |

FOREIGN PATENT DOCUMENTS

| | | |
|---|---|---|
| JP | 2005086256 | 3/2005 |
| JP | 4394674 | 1/2010 |

OTHER PUBLICATIONS

Mahalingam et al., "Virtual eXtensible Local Area Network (VXLAN): A Framework for Overlaying Virtualized Layer 2 Networks over Layer 3 Networks", RFC 7348, Aug. 2014, pp. 1-22.

(Continued)

*Primary Examiner* — Kashif Siddiqui
(74) *Attorney, Agent, or Firm* — Nolte Lackenbach Siegel (57) ABSTRACT

A method for use in a network, including: receiving network traffic at a redundant gateway device established according to a redundant gateway protocol; forwarding known unicast traffic received at the redundant gateway device from the redundant gateway device to a tunnel endpoint through a tunnel established according to a tunneling protocol; forwarding broadcast, unknown unicast, and multicast traffic to the tunnel endpoint through the tunnel if the redundant gateway device is a master gateway under the redundant gateway protocol; and dropping the broadcast, unknown unicast, and multicast traffic if the redundant gateway device is a backup gateway under the redundant gateway protocol.

20 Claims, 5 Drawing Sheets

(56) References Cited

U.S. PATENT DOCUMENTS

| | | | |
|---|---|---|---|
| 9,509,522 B2 * | 11/2016 | Song | H04L 45/48 |
| 9,847,932 B2 | 12/2017 | Gundavelli et al. | |
| 2016/0080502 A1 * | 3/2016 | Yadav | H04L 47/22 |
| | | | 709/227 |
| 2016/0210209 A1 * | 7/2016 | Verkaik | G06F 11/2033 |
| 2016/0277509 A1 * | 9/2016 | Qiang | H04L 67/1002 |
| 2016/0308690 A1 * | 10/2016 | Chanda | H04L 41/0803 |
| 2017/0359247 A1 | 12/2017 | Dixon et al. | |
| 2018/0034722 A1 | 2/2018 | Gupta et al. | |

OTHER PUBLICATIONS

S. Nadas, Ed., "Virtual Router Redundancy Protocol (VRRP) Version 3 for IPv4 and IPv6", RFC 5798, Mar. 2010, pp. 1-40.
VRRP with VPN Failover, (Research Paper), Retrieved Jun. 14, 2018, 19 Pgs.

* cited by examiner

ACHIEVING L2 TUNNEL REDUNCANCY AND L3 LOAD BALANCING

CROSS-REFERENCE TO RELATED APPLICATIONS

This application claims the benefit of Indian Appl. No. 201841034039, filed Sep. 10, 2018. This application is incorporated herein by reference in its entirety to the extent consistent with the present application.

BACKGROUND

Many computing systems involve a large number of computers working together. One such arrangement is known as a "network", which is usually considered to be two or more computing systems linked together using certain industry standard protocols. Many networks are designed and operated according to the Open Systems Interconnection ("OSI") model. The OSI Model separates the structure and functionality of a network into seven parts or "layers". Each layer is assigned certain tasks that it completes and then transfers to another layer for further processing.

The seven layers of the OSI Model include the physical, data link, network, transport, session, presentation, and application layers. Sometimes the various layers are referred to by their position in the hierarchy of the layers for convenience. So, for example, the data link layer is sometimes referred to as "L2" or "Layer 2" and the network layer is sometimes referred to as "L3" or "Layer 3". The L2 layer receives data from the physical layer and compiles it into a transform form called a "frame" or "framing" using certain protocols. L3 performs real time processing and transfers data between nodes of the network using hardware network devices such as switches and certain other protocols. This convention in terminology may be extended so that reference may be made to, for example, the L2 or Layer 2 network and the L3 or Layer 3 network, both of which may be a part of the same physical network.

Examples of protocols used by various layers include, for example, Virtual Router Redundancy Protocol ("VRRP") and Virtual eXtensible Local Area Network ("VXLAN"). VRRP is a default redundant gateway protocol that overcomes single point of failure in a network that may cause connectivity loss. VRRP provides for dynamic assignment of data gateway responsibility in a network to a member of a set of VRRP routers that act as a single virtual router. Another protocol is known as VXLAN. Tunneling protocols like VXLAN can be used to extend the Layer 2 network (sometimes also called "overlay") over a Layer 3 network (sometimes also called "underlay"). VXLAN can be used in scenarios like wireless access points talking to a controller, or in data center scenarios, or in distribution networks where Internet Protocol ("IP") subnet is to be extended.

BRIEF DESCRIPTION OF THE DRAWINGS

Examples described herein may be understood by reference to the following description taken in conjunction with the accompanying drawings, in which like reference numerals identify like elements.

While examples described herein are amenable to various modifications and alternative forms, the drawings illustrate specific examples described herein. It should be understood, however, that the description of specific examples is not intended to be limiting to the particular forms disclosed, but on the contrary, the intention is to cover all modifications, equivalents, and alternatives falling within the spirit and scope of the examples described herein and in the appended claims.

DETAILED DESCRIPTION

Illustrative examples, of the subject matter claimed below will now be disclosed. In the interest of clarity, not all features of an actual implementation are described in this specification. It may be appreciated that in the development of any such actual example, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine, undertaking for those of ordinary skill in the art having the benefit of this disclosure.

The examples disclosed herein use a redundant gateway protocol, such as VRRP, and a tunneling protocol, such as VXLAN, to achieve tunnel redundancy, so that there are multiple paths to extend a subnet while controlling switching and known unicast traffic. As will be explained further below, the redundant gateway protocol state is used to control BUM traffic coming into the tunnels to prevent network loops. For known unicast traffic, the redundant gateway protocol state will be ignored and known unicast traffic will be allowed into a redundant tunnel even if the redundant gateway protocol state is not active. This will allow load balancing of tunnels in the case of known unicast traffic forwarded to its destination while preventing duplicate paths from occurring g in the case of BUM traffic. Accordingly, the redundant gateway protocol state is used selectively depending on whether the traffic is BUM traffic or known unicast traffic to achieve redundancy and load-balancing.

Figure 1:
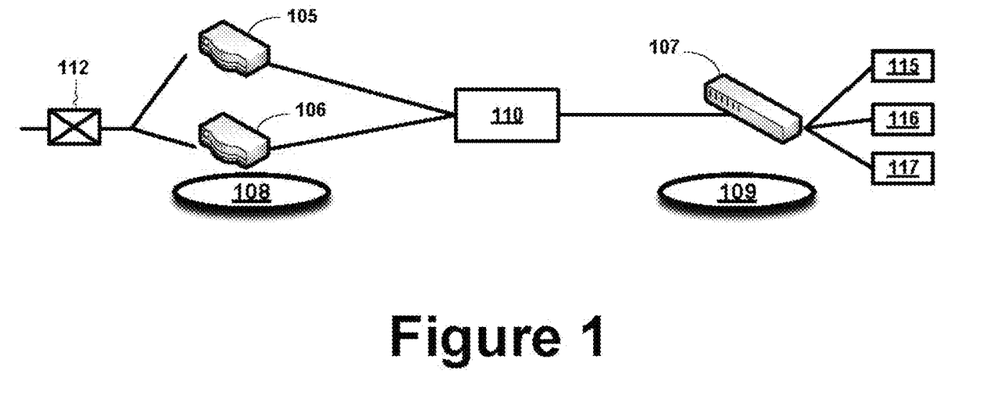
FIG. 1 conceptually illustrates one particular computing system according to one or more examples according to the claimed subject matter below.

Turning now to the drawings, FIG. 1 conceptually illustrates a computing system 100. The computing system 100 having at least three network devices 105-107. The network devices 105-107 may be any kind of network device involved in the handling or processing of packet-based information. For example, the network devices 105-107 may be switches, routers, bridges, or other packet processing devices or equipment. The network devices 105-107 are part of a network 110 through which they may be interconnected. The network 110 may be a public network, such as the Internet, or other type of network configured to allow communication between devices.

The network devices 105, 106 are located at a first location 108 while the network device 107 is located at a second location 109. The computing system 100 is used to transmit a data packet 112 in a manner described below to a destination such as the network devices 115-117, which may include any one of a number of categories of devices. For example, the network devices 105-107 may include stationary devices, such as printers, mobile devices, smart phones, tablets, etc. The data packet 112 is part of one or more kinds of "traffic" as discussed more thoroughly below and the transmission of the packet 112 traverses the network 110 on the way to the destination of the data packet 112.

Figure 2:
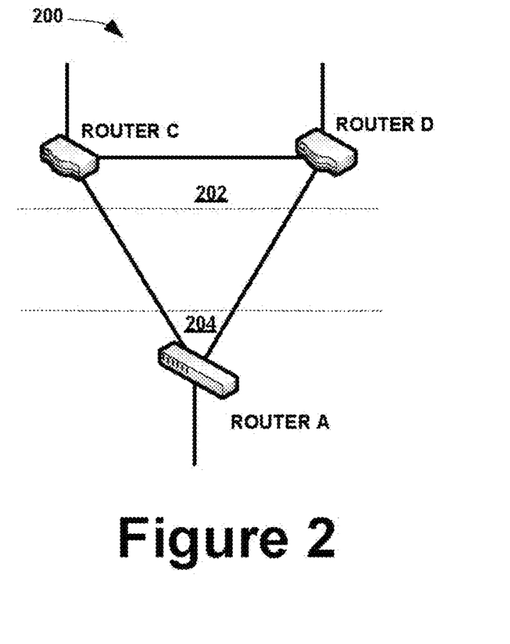
FIG. 2 conceptually illustrates one particular implementation of the computing system in FIG. 1 and, more particularly, the underlay network of the computing system.

FIG. 2 conceptually illustrates a portion of one particular implementation of the computing system 100 in FIG. 1 and, more particularly, an underlay network 200 of a computing system 100. The underlay network 200 is the physical structure of the network above which the overlay network, discussed below, is built. It is the underlying network responsible for delivering packets (e.g., packet 112 in FIG. 1) in traffic across networks. The underlay network 200 includes Router C and Router D at a first location 202 and Router A at a second location 204.

The underlay network 200 may be an OSI model L3 subnet of the computing system 100, which is not otherwise shown. The underlay network 200 employs a redundant gateway protocol. In the illustrated example, the redundant gateway protocol is VRRP, but other redundant gateway protocols may be used without departing from the scope of this disclosure. When a connection is established to the underlay network 200 for the transmission of traffic (e.g., the packet 112 in FIG. 1), this is called a "session". At the time the session is initiated, one gateway network device will be designated the "master" gateway and another gateway network device will be designated a "backup" gateway. Note that in different sessions different gateway network devices may be designated the master and the backup.

According to the redundant gateway protocol, Router C is the "master" gateway and Router D is the "backup" gateway for the underlay network 200 which may be designated IP 192.168.0.50 for the current session illustrated. Router C is therefore on one end of the tunnel 302, shown in FIG. 3 and discussed below, between location 202 and location 204. Together, Router C and Router D provide redundant access to the computing system 100 for a given connection to the computing system 100. Should Router C fail or otherwise become unavailable, the functionality of the master gateway shifts to Router D and Router D becomes the master gateway.

The Routers A, C, and D are physically interconnected using, for example, wires or cable, which may be electrical or optical, for example. Those in the art will appreciate that the underlay network 200, and the computing system 100 in general, may be more complex than is illustrated in FIG. 2. Such complexity is known and well understood in the art and so will not be further discussed so as not to obscure the disclosure. Each of the Routers A, C, and D has an assigned underlay IP address. Table 1 contains examples of the kinds of underlay IP addresses that may be assigned.

TABLE 1

Example Underlay IP Addresses

| Network Device | IP Address |
| --- | --- |
| Router A | 192.168.0.60/24 |
| Router C | 192.168.0.1/24 |
| Router D | 192.168.0.2/24 |

Figure 3:
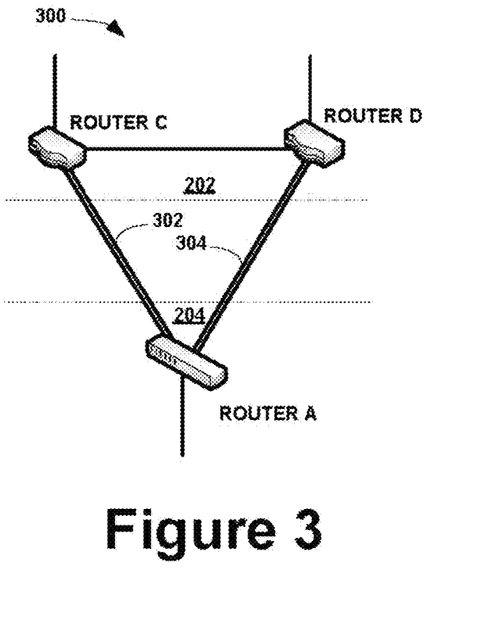
FIG. 3 conceptually illustrates one particular implementation of the computing system in FIG. 1 and, more particularly, the overlay network of the computing system.

FIG. 3 conceptually illustrates an overlay network 300 extended over the underlay network 200 shown in FIG. 2. More particularly, the overlay network 300 is a virtual network built on top of an underlying network physical infrastructure—i.e., the underlay network 200. The overlay network 300 is an L2 subnet layered over an L3 subnet, the underlay network 200. This particular example uses the VXLAN protocol discussed above to construct the overlay network 300 on top of the underlay network 200. Other protocols besides VXLAN may be used in alternative implementations.

More precisely, VXLAN is a network virtualization technology that supports "tunneling". Tunneling is a process by which packets of information are encrypted and "encapsulated" into public transmission units (along with other information) so that they appear to be public information as they traverse the tunnel. This is particularly useful if the original information originates in a private network, as it helps the private information evade detection as it traverses through the public network. The encapsulation occurs at the gateway network device as the original information enters the tunnel. On reaching the end of the tunnel, the original information is de-encapsulated and decrypted, Because VXLAN supports tunneling, it may be considered a "tunneling protocol" in this context. For purposes of this disclosure, any L2 technology or L2 protocol that supports and, implements tunneling may be considered a "tunneling protocol" and may be used to establish the tunnels discussed below.

The overlay network 300 includes Routers A, C, and D. Because the overlay network 300 is a virtual network, each of the routers is assigned an overlay IP address. Table 2 contains some example overlay IP addresses for the illustrated overlay network 300. Thus, each of the Routers A, C, and D has an IP address in the underlay network 200 and an overlay IP address in the in the overlay network 300.

TABLE 2

Example Overlay Addresses

| Network Device | Overlay IP Address |
| --- | --- |
| Router A | 10.0.0.60/24 |
| Router C | 10.0.0.1/24 |
| Router D | 10.0.0.2/24 |

Because there are redundant gateway devices, there are redundant tunnels. In the illustrated example, there are redundant first and second tunnels 302, 304. Each tunnel 302, 304 originates at Router A and terminates at a respective gateway device, i.e., Router C and Router D, respectively, in the direction from location 204 to location 202. However, only the tunnel 302 is active in this direction since the Router C is the master gateway device and is assigned the virtual IP address for the master gateway device. In the direction from location 202 to location 204, both tunnels 302 and 304 are active. The tunnels 302, 304 are established according to the particular tunneling protocol employed. As a part of the process, a tunnel endpoint is also designated at a particular overlay IP address. In the illustrated example, the overlay IP address for the tunnel endpoint is 192.168.0.50.

Figure 4:
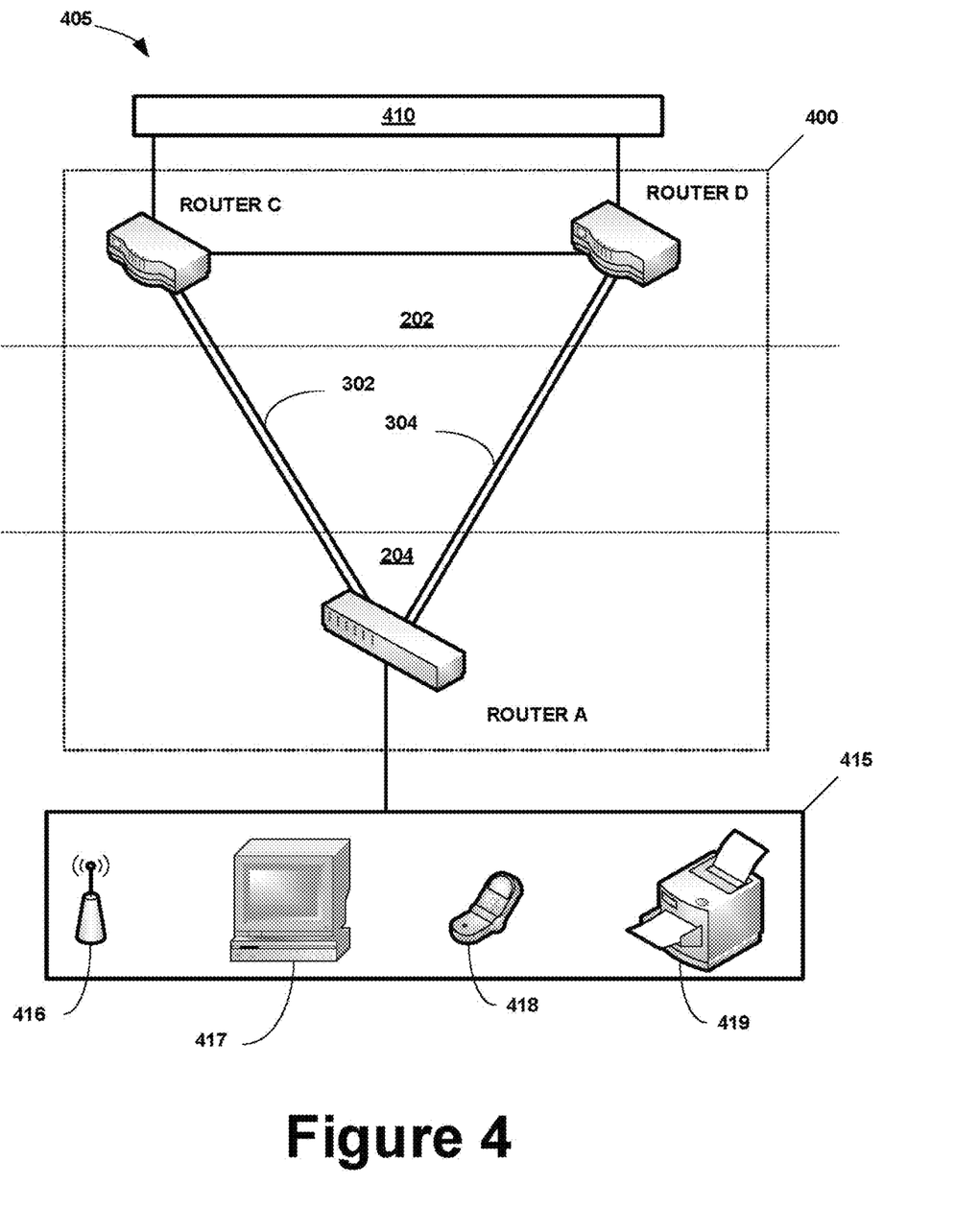
FIG. 4 conceptually illustrates the combined underlay and overlay networks of FIG. 2 and FIG. 3 as deployed in a larger computing environment.

FIG. 4 conceptually illustrates the combined underlay and overlay networks 200, 300 of FIG. 2 and FIG. 3, generally designated 400, as deployed in a larger computing environment 405, with like parts bearing like numbers. The larger computing environment 400 includes an external source 410 of network traffic. The source of network traffic 410 may be, for example, a private network, such as may be used by large corporations or other organizations.

The combined underlay and overlay networks 400 also deliver traffic to any one or more of a number of destinations 415. There is only one tunnel 302 (from IP address 192.168.0.60 to 192.168.0.50 (VIP)) from location 204 (where Router A situates) to location 202 (where Router C and Router D situate). This tunnel 302 terminates on IP 192.168.0.50 which is a underlay IP address of one session between Router C and Router D. Since it terminates on a virtual IP if by any chance Router C fails, the tunnel 302 terminates on Router D and Router D becomes the VRRP master gateway of the session for 192.168.0.50. But using this configuration achieves L2 tunnel redundancy. This tunnel 302 is from location 204 to Location 202. When (if) Router C fails, the tunnel 302 then terminates on Router D. Same tunnel 302, but terminates on Router D because it is the new master gateway. But, in a reverse path, there are multiple paths from location 202 to location 204. This includes not only the tunnel 302 discussed above, but also tunnel 304 in the reverse direction from location 202 to location 204. This tunnel 204 is active from both Router C (the master gateway) and Router D (the backup gateway) to Location 204.

But traffic controls are present. The BUM traffic is allowed only via Router C, which is the VRRP Master as described above. Similarly, the known unicast traffic will be allowed via any Router in location 202—for example, Router C or Router D. Note that in some embodiments there may be more than, two network devices in location 202 than the two illustrated in this example. So the presently disclosed technique uses the redundant gateway protocol state (e.g., VRRP master state in the illustrated example, in the opposite direction to control the BUM traffic.

In FIG. 4, several representative destinations 415 are shown. These include a wireless access point 416, and an electronic device, such as a personal computer 417, a mobile device 418, and a printer 419. However, the destinations 415 are not limited to those shown and other destinations may be found in other examples. For example, other destinations 415 may include monitoring or control systems in manufacturing or production facilities or destinations within other private or public networks. Some of this network traffic is broadcast, unknown unicast, and multicast ("BUM") traffic and some is known unicast traffic.

BUM traffic presents a phenomenon that is referred to as "looping" in some conventional practice. Traffic entering the combined underlay and overlay networks 400 through the redundant gateway network device Router C may be forwarded to the destination network device Router A through the tunnel 302. Router A may then forward the BUM traffic to Router D through the tunnel 304, whereupon Router D forwards the BUM traffic to Router C, wherein the process repeats. The same happens when BUM traffic enters the combined underlay and overlay networks 400 through the gateway network device Router D if Router D is the active master gateway. Consequently, the combined underlay and overlay networks 400 become overly congested with extraneous BUM traffic. The present disclosure presents an approach that facilitates mitigation, or even elimination, of this problem.

Figure 5:
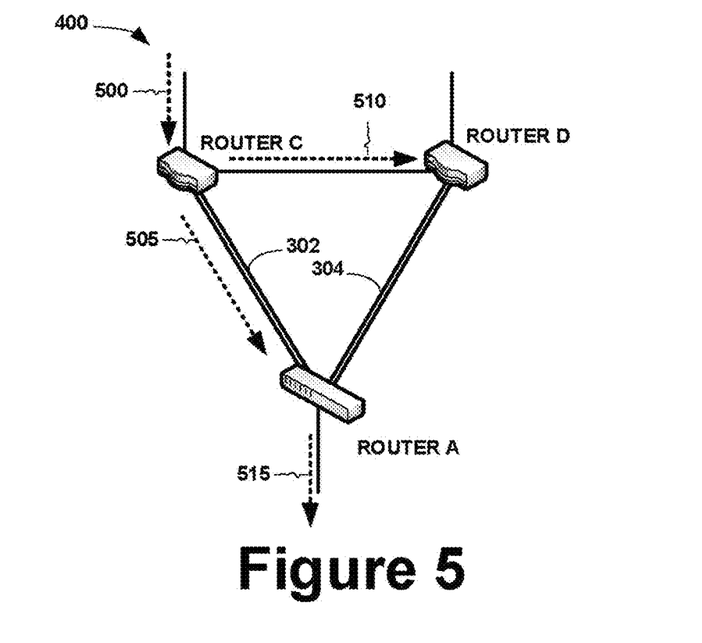
FIG. 5 illustrates the traffic flow for broadcast, unknown unicast, and multicast ("BUM") traffic in the combined underlay and overlay networks shown in FIG. 4.

FIG. 5 illustrates the flow for BUM traffic in the combined underlay and overlay networks 400. In the following description, reference is made to the "redundant gateway protocol state". Each gateway network device has a redundant gateway protocol state. As described above, Router C has been designated the master gateway and Router D has been designated the backup gateway for the illustrated Session for the IP 192.168.0.50. Thus, the redundant gateway protocol state for Router C is "master" and the redundant gateway protocol state for Router D is "backup". The redundant gateway protocol state determines whether a gateway device forwards BUM traffic as will now be discussed.

Network traffic enters the combined underlay and overlay networks 400 through the master gateway Router C as indicated by arrow 500. The redundant gateway protocol state for Router C is "master", thus, Router C forwards the BUM traffic to the destination Router A through the tunnel 302 and to the backup gateway Router D, as indicated by the arrows 505, 510, respectively. (Note that the BUM traffic is encapsulated on entering the tunnel 302 and de-encapsulated upon arrive at Router A, as discussed above.) Router D has a redundant gateway protocol state of "backup", and as such, does not forward the BUM traffic. (The same result occurs if BUM traffic enters the combined underlay and overlay networks 400 via Router D, as Router D has a redundant gateway protocol state of "backup".) Router A does not have a redundant gateway protocol state, and as such, does not have a redundant gateway protocol state of "master". Router A therefore also does not forward the BUM traffic to Router D. However, Router A does forward the 'BUM traffic toward its destination as indicated by the arrow 515. Accordingly, no looping occurs.

Figure 6:
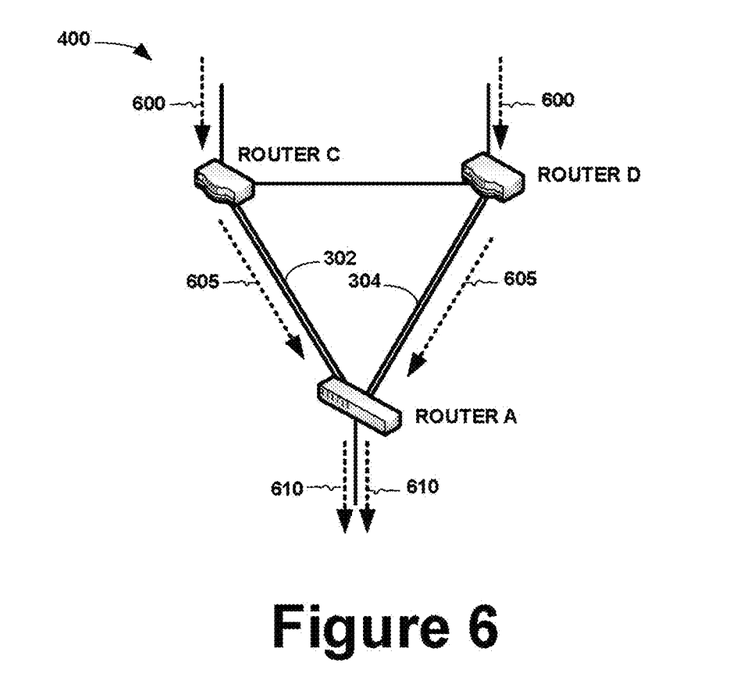
FIG. 6 illustrates the traffic flow for known unicast traffic in the combined underlay and overlay networks shown in FIG. 4.

The known unicast traffic flows differently. FIG. 6 illustrates the flow of known unicast traffic in the combined underlay and overlay network 400 of FIG. 4 and FIG. 5. The known unicast traffic is received from the external source 410 (shown in FIG. 4) as indicated by arrows 600. Each gateway device (i.e., Router C and Router D) that receives known unicast traffic forwards the known unicast traffic to Router A via the tunnels 302, 304 as indicated by the arrows 605 irrespective of their gateway protocol state. (Note: the known unicast traffic is encapsulated and de-encapsulated as part of its transmission thorough the tunnels 302, 304.) The know nicest traffic is then forwarded as indicated by the arrows 610 from Router A to toward their destination. Because the destination is known, the known unicast traffic does not loop through the combined underlay and overlay networks 400 in the same manner as BUM traffic.

Figure 7:
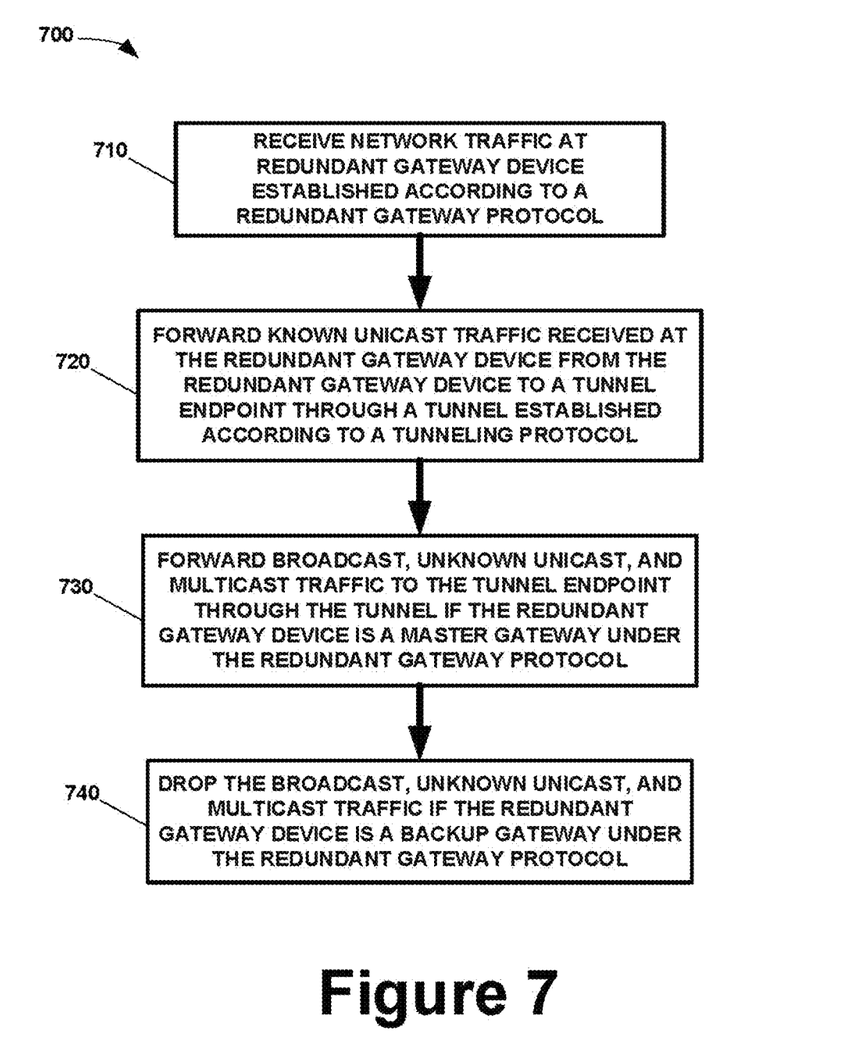
FIG. 7 illustrates a method practiced by gateway devices of the computing system shown in FIG. 1-FIG. 3 in operation in, one particular example.

Thus, in operation, each of the gateway network devices Router C and Router D perform a method such as the method 700 illustrated in FIG. 7 during a session. The method 700 begins by receiving (at 710) network traffic at a redundant, gateway device established according to a redundant gateway protocol. This is followed by forwarding (at 720) known unicast traffic received at the redundant gateway device from the redundant gateway device to a tunnel endpoint through a tunnel established according to a tunneling protocol. The method 700 continues by forwarding (at 730) broadcast, unknown unicast, and multicast traffic to the tunnel endpoint through the tunnel if the redundant gateway device is a master gateway under the redundant gateway protocol. This is accompanied by dropping (at 740) the broadcast, unknown unicast, and multicast traffic if the redundant gateway device is a backup gateway under the redundant gateway protocol.

Figure 8:
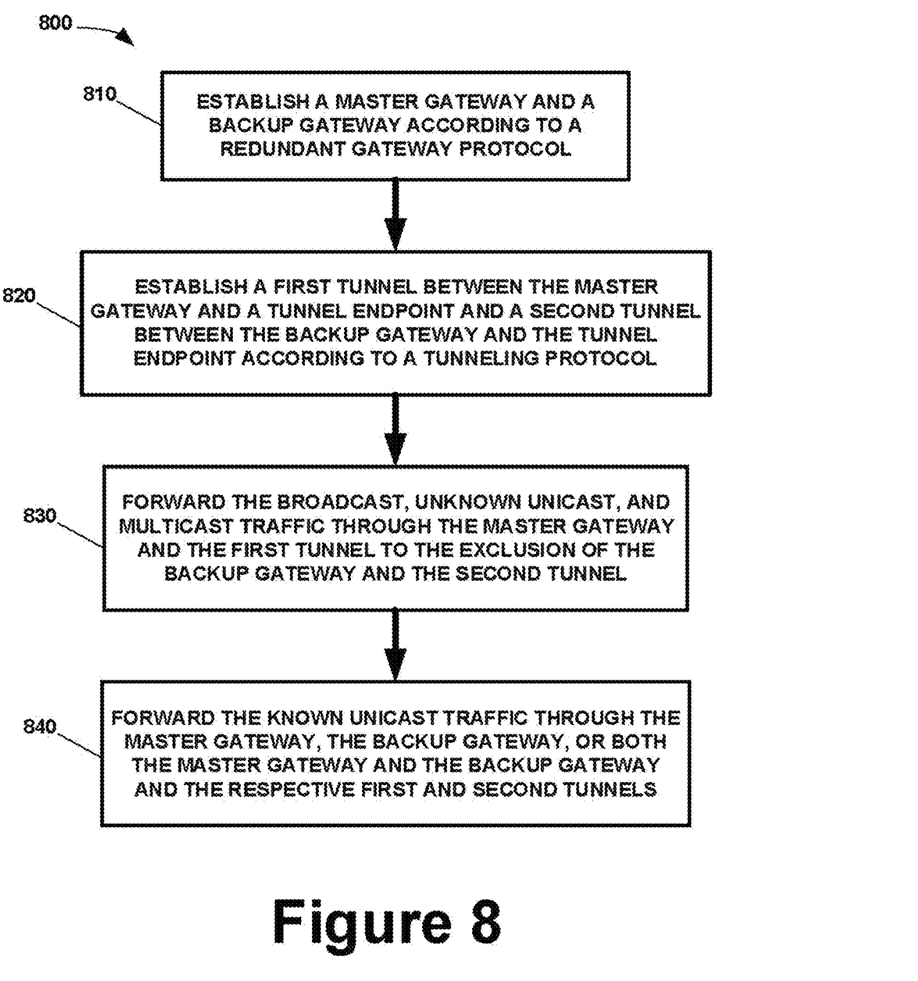
FIG. 8 illustrates a method practiced by the computing system of FIG. 1-FIG. 3 in operation in one particular example.

More generally, the computing system 100 (shown in FIG. 1) performs a method such as the method 800 in operation. The, method 800 begins by establishing (at 810) a master gateway and a backup gateway according to a redundant gateway protocol. It then establishes (at 820) a first tunnel between the master gateway and a tunnel endpoint and a second tunnel between the backup gateway and the tunnel endpoint according to a tunneling protocol. The method 800 continues by forwarding (at 830) the broadcast, unknown unicast, and multicast traffic through the master gateway and the first tunnel to the exclusion of the backup gateway and the second tunnel and forwarding (at 840) the known unicast traffic through the master gateway, the backup gateway, or both the master gateway and the backup gateway and the respective first and second tunnels.

The claims below and the discussion above set forth the steps of the methods 700, 800 in FIG. 7 and FIG. 8. However, the claims are not limited by the ordering of the steps as set forth therein or discussed above. For example, the handling of the BUM traffic and the known unicast traffic occurs in the order it is received. Similarly, the order in which the gateway device protocol state is determined relative to the establishment of the tunnels is not material. It is to be understood that the ordering of the steps in the claims does not determine the scope of protection granted hereunder unless the language of the claims themselves dictates such a conclusion.

Figure 9:
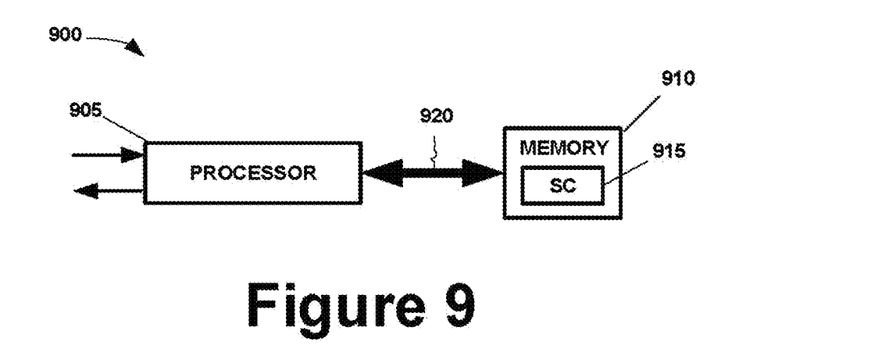
FIG. 9 conceptually depicts selected portions of the hardware and software architecture of a representative network device such as may be used in the computing system of FIG. 1-FIG. 3 in one or more examples.

The functionality represented in FIG. 7-FIG. 8 is software-implemented and, in the illustrated example, distributed across the network devices Router C, Router D, and Router A. FIG. 9 conceptually depicts selected portions of the hardware and software architecture of a representative network device such as may be used in the computing system of FIG. 1-FIG. 3 in one or more examples. The network device may be, for example, selected from the group consisting of switches, routers, and bridges. However, the representative network device may be any suitable network device known in the art so long as it has been programmed as described herein to implement the functionality of, for example, FIG. 7-FIG. 8.

The representative network device 900 includes a processor 905, a memory 910, and a software component 915 resident on the memory 910 that may be invoked and executed by the processor 905 over a communications link 920. The processor 905 may be any kind of suitable processor such as a microcontroller, a controller, a microprocessor, or even a microprocessor set. The memory 910 may include both read-only memory ("ROM") and random-access memory ("RAM"), as well as removable memory such as an optical disk if desired. The software component 915 may be any suitable form of executable code known to the art. It may be, for example, firmware, an application, a function, etc. The communication link 920 may be, for example, a bus operating according to according to any suitable bus protocol known to the art.

As noted above, FIG. 9 depicts only selected portions of the hardware and software architecture of the representative network device 900. Other portions have been omitted for the sake of clarity and so as to avoid obscuring that which is claimed below. For example, there will be software that performs the encapsulation and the de-encapsulation in the tunneling described above. There will also be other software and hardware elements related to their specific role in the computing system 100. Those in the art having, the benefit of this disclosure will appreciate that these omitted elements are present in the various, specific implementations of the subject matter claimed below.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, which manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the technique disclosed herein are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known in the art. The technique is not limited by these aspects of any given implementation.

This concludes the detailed description. The particular embodiments disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the appended claims. Accordingly, the protection sought herein is as set forth in the claims below.

What is claimed is:

1. A method for establishing a redundant gateway in a network, comprising:
   operating, by a first gateway, the redundant gateway in conjunction with a second gateway according to a redundant gateway protocol;
   maintaining a first tunnel between the first gateway and a tunnel endpoint according to a tunneling protocol, wherein the second gateway maintains a second tunnel between the second gateway and the tunnel endpoint;
   in response to the first gateway operating as a primary gateway for the redundant gateway, forwarding broadcast, unknown unicast, and multicast traffic via the first tunnel to the tunnel endpoint;
   in response to the first gateway operating as a backup gateway for the redundant gateway, dropping the broadcast, unknown unicast, and multicast traffic; and
   forwarding known unicast traffic via the first tunnel to the tunnel endpoint regardless of whether the first gateway operates as the primary gateway or the second gateway.

2. The method of claim 1, wherein the redundant gateway protocol is a Virtual Router Redundancy protocol (VRRP).

3. The method of claim 1, wherein the tunneling protocol is a Virtual eXtensible Local Area Network (VXLAN) protocol.

4. The method of claim 1, wherein the first gateway and the second gateway are network devices selected from the group consisting of a switch, a router, and a bridge.

5. The method of claim 1, wherein the tunnel endpoint is associated with a virtual Internet Protocol (IP) address allocated to a network device.

6. The method of claim 1, further comprising:
   in response to the first gateway operating as the backup gateway for the redundant gateway, transferring functionality of the primary gateway from the second gateway to the first gateway upon unavailability of the second gateway; and
   forwarding, by the first gateway, the broadcast, unknown unicast, and multicast traffic via the second tunnel to the tunnel endpoint.

7. A computing system, comprising:
   a processor;
   a non-transitory computer-readable storage medium storing instructions, which when executed by the processor causes the processor to perform a method for establishing a redundant gateway in a network, the method comprising:
   operating the redundant gateway in conjunction with a remote computing system according to a redundant gateway protocol;
   maintaining a first tunnel between the computing system and a tunnel endpoint, wherein the remote computing system maintains a second tunnel between the remote computing system and the tunnel endpoint;
   in response to the computing system operating as a primary gateway for the redundant gateway, forwarding broadcast, unknown unicast, and multicast traffic via the first tunnel to the tunnel endpoint;
   in response to the computing system operating as a backup gateway for the redundant gateway, dropping the broadcast, unknown unicast, and multicast traffic; and
   forwarding known unicast traffic via the first tunnel to the tunnel endpoint regardless of whether the computing system operates as the primary gateway or the backup gateway.

8. The computing system of claim 7, wherein the redundant gateway protocol is a Virtual Router Redundancy protocol (VRRP).

9. The computing system of claim 7, wherein the tunneling protocol is a Virtual eXtensible Local Area Network (VXLAN) protocol.

10. The computing system of claim 7, wherein the computing system and the remote computing system are network devices are selected from the group consisting of switches, routers, and bridges.

11. The computing system of claim 7, wherein the method further comprises:
    in response to the computing system operating as a backup gateway for the redundant gateway, transferring functionality of the primary gateway from the remote computing system to the computing system upon unavailability of the remote computing system; and
    forwarding the broadcast, unknown unicast, and multicast traffic via the second tunnel to the tunnel endpoint.

12. The computing system of claim 7, wherein the tunnel endpoint is associated with a virtual Internet Protocol (IP) address allocated to a network device.

13. A non-transitory machine-readable storage medium encoded with instructions, the instructions executable by a processor to cause the processor to perform a method for establishing a redundant gateway in a network, the method comprising, comprising:
    operating, by a first gateway, the redundant gateway in conjunction with a second gateway according to a redundant gateway protocol;
    maintaining a first tunnel between the first gateway and a tunnel endpoint according to a tunneling protocol, wherein the second gateway maintains a second tunnel between the second gateway and the tunnel endpoint;
    in response to the first gateway operating as a primary gateway for the redundant gateway, forwarding broadcast, unknown unicast, and multicast traffic via the first tunnel to the tunnel endpoint;
    in response to the first gateway operating as a backup gateway for the redundant gateway, dropping the broadcast, unknown unicast, and multicast traffic; and
    forwarding known unicast traffic via the first tunnel to the tunnel endpoint regardless of whether the first gateway operates as the primary gateway or the backup gateway.

14. The non-transitory machine-readable storage medium of claim 13, wherein the redundant gateway protocol is a Virtual Router Redundancy protocol (VRRP).

15. The non-transitory machine-readable storage medium of claim 13, wherein the tunneling protocol is a Virtual eXtensible Local Area Network (VXLAN) protocol.

16. The non-transitory machine-readable storage medium of claim 13, wherein the first gateway and the second gateway are network devices selected from the group consisting of a switch, a router, and a bridge.

17. The non-transitory machine-readable storage medium of claim 13, wherein the tunnel endpoint is associated with a virtual Internet Protocol (IP) address allocated to a network device.

18. The non-transitory machine-readable storage medium of claim 13, where the method further comprises:
    in response to the first gateway operating as a backup gateway for the redundant gateway, transferring functionality of the the primary gateway from the second gateway to the first gateway upon unavailability of the second gateway; and forwarding, by the first gateway, the broadcast, unknown unicast, and multicast traffic via the second tunnel to the tunnel endpoint.

19. The method of claim 1, wherein the first and second tunnels form an overlay network in the network.

20. The computing system of claim 7, wherein the first and second tunnels form an overlay network in the network.

* * * * *